June 4, 1929. F. H. GOODRICH 1,715,652
BUMPER
Filed Sept. 3, 1926
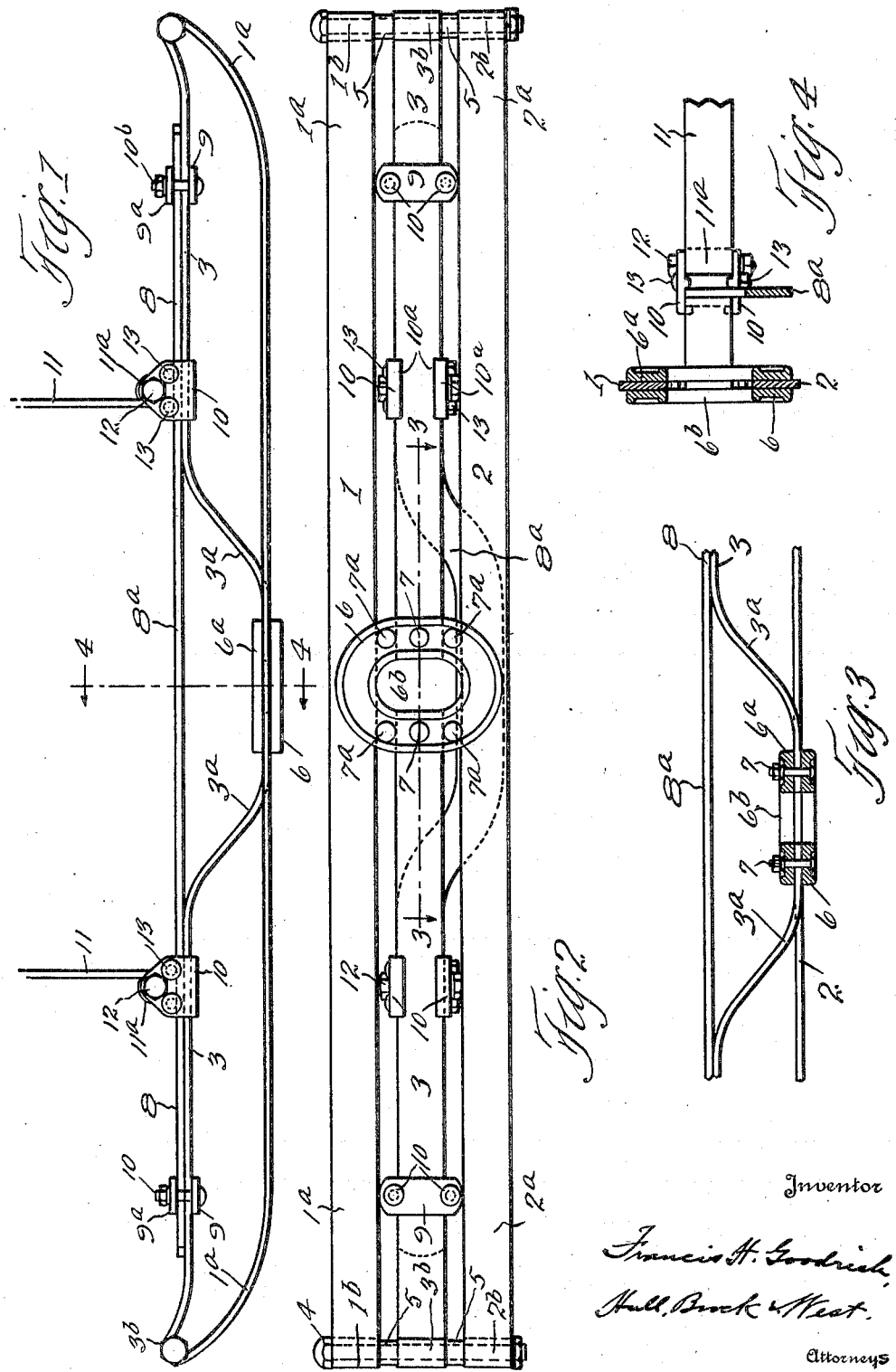

Patented June 4, 1929.

1,715,652

UNITED STATES PATENT OFFICE.

FRANCIS H. GOODRICH, OF DETROIT, MICHIGAN, ASSIGNOR TO THE C. G. SPRING & BUMPER COMPANY, OF DETROIT, MICHIGAN, A CORPORATION OF DELAWARE.

BUMPER.

Application filed September 3, 1926. Serial No. 133,404.

The invention relates to bumpers for automobiles, and has for one of its objects to provide a bumper which, while comprising a plurality of vertically spaced impact bars, will permit the insertion of a starting crank between such bars without any material sacrifice in the strength of the bumper.

Further objects of the invention will appear hereinafter and will be realized by the construction and arrangement of parts shown in the drawings hereof, wherein Fig. 1 represents a plan view of a bumper constructed in accordance with my invention, the said view showing portions of the supporting arms and of the means for securing the bumper thereto; Fig. 2 a front elevation of the bumper shown in Fig. 1; Fig. 3 a detail in section corresponding to the line 3—3 of Fig. 2; and Fig. 4 a detail in section corresponding to the line 4—4 of Fig. 1.

The bumper shown herein comprises a front or impact section consisting of a plurality of vertically spaced front or impact bars, two such bars being shown herein and connected at their ends to the ends of a composite rear or auxiliary section, the bumper being of the general type shown in patent to McGregor No. 1,372,154, issued March 22, 1921.

Describing the various parts by reference characters, 1 denotes the upper, and 2 the lower, impact bar referred to, each bar having its ends curved rearwardly, as indicated at $1^a$ and $2^a$, respectively, and each being provided at each end thereof with an eye, the eyes on the bar 1 being indicated at $1^b$ and those on the bar 2 being indicated at $2^b$.

Cooperating with the front or impact section is the intermediate composite rear or auxiliary section. This section comprises a pair of bar members 3, 3, each having its inner end bent inwardly toward the front or impact bars, as indicated at $3^a$, and each having at its outer end an eye $3^b$, which is interposed between the corresponding eyes $1^b$ and $2^b$ of the impact bars and is connected thereto by means of bolts 4, there being short spacing sleeves 5 interposed between the eyes on the upper and lower impact bars and the centrally disposed eyes on the bar members 3. The inner ends $3^a$ of the bar members 3 do not meet, but are spaced apart a sufficient distance to enable a starting crank to be inserted between such opposed ends, the said ends $3^a$ being secured to and between front and rear clamping plates 6, $6^a$ by means of bolts 7 which extend through the clamping plates and through the inner ends of the bar members, the bolts $7^a$ also connecting the said clamping plates in place but being interposed between the bars 1 and 3 and the bars 2 and 3. The clamping plates, as shown, are so shaped as to provide a central opening $6^b$ in the bumper through which a starting crank may be inserted. This may be accomplished by giving to the clamping plates any shape which will provide such central opening or recess as well as the particular shape shown herein.

As shown herein, each clamping plate is elliptical in outline and is of sufficient vertical length to enable the plates to engage the front and rear faces of the bars 1 and 2.

In addition to the bar members 3, the rear or auxiliary section comprises a continuous reinforcing bar having ends 8 adapted to bear against and to be secured to the outer portions of the bar members 3 and having a central portion $8^a$ which is deflected in a vertical direction so as to permit the starting crank to pass through the center of the bumper. In the drawing, the central portion $8^a$ is shown as deflected downwardly. The ends 8 of the continuous reinforcing bar engage the rear faces of the bar members 3 and are secured to such members by means of clamping plates 9, $9^a$, and bolts $10^b$ connecting the said plates above and below the members 3 and 8. The reinforcing bar and the bar members 3 are further secured together by means of the upper and lower clamping plates 10 which support the bumper as a whole from the arms 11 by means of pivot bolts 12 which extend through eyes $11^a$ in the outer ends of the said arms and through the inner ends of the said clamping plates. Each of these plates has a flange $10^a$ at its front which is adapted to overhang and engage the front face of the corresponding bar member 3, and the clamping plates are additionally secured to the members 3 and the parts 8 by means of the bolts 13.

The bar 8, $8^a$ not only serves to strengthen the bumper and to compensate for lack of continuity in the back bar 3, $3^a$, but also serves to receive the bar 2 and the parts $3^a$ if the central portion of the bumper is deflected rearwardly a distance equal to or greater than that between the central portion of the reinforcing bar 8, 8ª and the corresponding portions of the parts 2 and 3ª. Should the central portions of the bars in the front of the part 8ª be deflected still further, such further rearward movement will be resisted by the frictional drag exerted upon the parts 8 by the clamping plates 9, 9ª and 10.

It is apparent that the reinforcing bar 8 may be bent upwardly at 8ª instead of downwardly if such a configuration would be more suitable in the use of the invention.

The rear bar 3, 3ª has been shown as made up of two members connected together by the clamp plates 6, 6ª. It is apparent that these members might be replaced by a continuous bar having an eye at each end and having its central portion horizontally offset to avoid the impact bars and vertically offset to provide a space for the reception of the crank, and it is not intended to limit the invention to the particular embodiment herein shown.

Having thus described my invention, what I claim is:

1. A bumper comprising a pair of vertically spaced front or impact bars and a rear or auxiliary bar comprising a pair of bar members each connected at its outer end to the corresponding ends of the impact bars and each having its inner portion projected toward the front or impact bars, and means for clamping the inner ends of said rear or auxiliary bar members to the said front or impact bars with the ends of the said bar members spaced apart for the reception of a crank.

2. A bumper comprising a pair of vertically spaced front or impact bars, and a rear or auxiliary bar comprising a pair of bar members each connected at its outer end to and between the corresponding ends of the impact bars and each having its inner portion projected toward and between the front or impact bars, and means for clamping the inner ends of said rear or auxiliary bar members to and between the said front or impact bars with the ends of the said bar members spaced apart for the reception of a crank.

3. A bumper comprising a pair of vertically spaced front or impact bars, and a rear or auxiliary bar comprising a pair of bar members each connected at its outer end to the corresponding ends of the front or impact bars and each having its inner portion projected toward the front or impact bars, and front and rear clamping plates securing the inner ends of the bar members to the front or impact bars and providing a central space through the bumper for the reception of a crank.

4. A bumper comprising a pair of vertically spaced front or impact bars, and a rear or auxiliary bar comprising a pair of bar members each connected at its outer end to the corresponding ends of the impact bars and each having its inner portion projected toward the front bars, and clamping means securing the inner ends of the bar members to the front or impact bars and having a central space for the insertion of a crank through the central part of the bumper.

5. A bumper comprising a pair of vertically spaced front or impact bars, a pair of rear or auxiliary bar members each having an outer end connected to ends of the front or impact bars and an inner end projected toward the space provided at the center of the bumper between said front or impact bars, the inner ends of the said bar members being spaced apart, means securing the inner ends of the said bar members to the front or impact bars, the said securing means providing a space through the center of the bumper for the reception of a crank, and a reinforcing bar secured to the said bar members and extending across the center of the bumper, the central portion of the last mentioned bar being deflected in a vertical direction to accommodate the passage of the said crank.

6. A bumper comprising a pair of vertically spaced front or impact bars, a pair of rear or auxiliary bar members each having its outer end connected to ends of the impact bars and an inner end projected toward the space provided at the center of the bumper between said front or impact bars, means securing the inner ends of the said bar members to the front or impact bars, and a reinforcing bar secured to the said bar members and extending across the center of the bumper, the central portion of the last mentioned bar being spaced rearwardly from the central portions of the other bars and bar members.

7. A bumper comprising a pair of vertically spaced front or impact bars, a pair of rear or auxiliary bar members each having its outer end connected to ends of the impact bars and an inner end projected toward the space provided at the center of the bumper between said front or impact bars, the inner ends of the said bar members being spaced apart, means securing the inner ends of the said bar members to the impact bars, the said securing means providing a space through the center of the bumper for the reception of a crank, and a reinforcing bar having end portions frictionally secured to the rear faces of the aforesaid bar members and having its central portion extending across the central portion of the bumper and deflected vertically to accommodate the said crank.

8. A bumper comprising a pair of vertically spaced front or impact bars, a rear or auxiliary bar having its ends secured to the ends of the impact bars and having a central portion deflected into substantially horizontal alignment with one of said impact bars.

9. The combination, with a pair of bumper supporting arms each having an eye at the outer end thereof, of a bumper comprising a pair of vertically spaced front or impact bars, a rear or auxiliary bar, the latter bar comprising a pair of bar members each having its outer end pivotally connected to and between ends of the impact bars and each having an inner portion projecting toward the space at and between the centers of said front or impact bars, the inner ends of said bar members being spaced apart, means for securing the said inner ends of the said bar members to the front or impact bars, the said rear or auxiliary bar comprising a reinforcing bar applied to the rear faces of the said bar members and extending across the space between the said arms, upper and lower clamping members pivotally secured to the eyes on said arms and to the said bar members and the reinforcing bar, and clamping means, additional to the said clamping members, for securing the end portions of the reinforcing bar to the said bar members.

10. The combination, with a pair of bumper supporting arms each having an eye at the outer end thereof, of a bumper comprising a pair of vertically spaced front or impact bars, a rear or auxiliary bar, the latter bar comprising a pair of bar members each having its outer end connected to ends of the impact bars and each having an inner portion projecting toward the space at and between the centers of said front or impact bars, means for securing the said inner ends of the said bar members to the front or impact bars, the said rear or auxiliary bar comprising a reinforcing bar applied to the rear faces of the said bar members and extending across the space between the said arms, upper and lower clamping members pivotally secured to the eyes on said arms and to the said bar members and the reinforcing bar, and clamping means, additional to the said clamping members for securing the end portions of the reinforcing bar to the said bar members.

11. A bumper comprising in combination a pair of vertically spaced front or impact bars and a rear or auxiliary bar, the latter bar comprising bar members connected at their outer ends to the front or impact bars and having their inner portions projected toward and connected to the central portions of said front or impact bars with their inner ends spaced apart, and a reinforcing bar clamped to the rear faces of the said bar members and having its central portion deflected vertically to provide, with the inner ends of the said bar members, an open space through the center of the bumper.

12. A bumper comprising a pair of vertically spaced front or impact bars, a rear or auxiliary bar comprising a pair of bar members having their outer ends pivotally connected to outer ends of the front or impact bars and their inner ends projected toward and secured to the central portions of the front or impact bars, a reinforcing bar applied to the rear faces of the said bar members and extending across the central portion of the bumper with its center spaced rearwardly from the centers of the front or impact bars, supporting arms for the bumper, clamps secured to the outer ends of the supporting arms and engaging the bar members and the auxiliary bar, and additional clamping members for securing the outer ends of the reinforcing bar to the outer portions of the said bar members, the clamping means which so secure the reinforcing bar to the said bar members being arranged to exert a frictional drag between the reinforcing bar and the bar members when the bumper is subjected to blows tending to produce longitudinal movements between the said reinforcing bar and the said bar members.

13. A bumper comprising vertically spaced front or impact bars and a rear or auxiliary bar comprising a pair of bar members each connected at its outer end to the corresponding ends of the impact bars and each having its inner portion projected toward the front or impact bars, and means for securing the inner ends of said rear or auxiliary bar members to a front or impact bar with the ends of the said bar members spaced apart for the reception of a crank.

14. A bumper comprising vertically spaced front or impact bars and a rear or auxiliary bar comprising a pair of bar members each connected at its outer end to the corresponding ends of the impact bars and each having its inner portion projected toward the front or impact bars, and front and rear clamping plates securing the inner ends of the bar members to a front or impact bar and providing a central space through the bumper for the reception of a crank.

15. A bumper comprising a pair of vertically spaced impact bars and a reinforcing section, said reinforcing section having a portion intermediate its ends projecting forwardly for connection to and between said impact bars, said forwardly projecting section being so shaped as to provide an open space through the bumper adjacent the point of attachment.

16. A bumper comprising an impact section and a reinforcing section, said reinforcing section having portions spaced rearwardly from the impact section and being adapted to be connected at its outer ends and central portion to the impact section, said central portion having an aperture opposite an aperture in the impact section, and a rear bar adapted to be connected at its end portions to the end portions of said aforementioned section and having its central portion shaped to provide an opening opposite the aforesaid apertures.

17. A bumper comprising an impact section and a reinforcing section, said reinforcing section having a central portion horizontally offset for connection to the impact section and vertically offset to provide an aperture opposite an aperture in the impact section, and a rear bar adapted to be connected to the end portions of the first mentioned bar having its central portion vertically offset to provide an open space in line with the aforesaid apertures.

18. A bumper comprising an impact section and a reinforcing section, said reinforcing section comprising a pair of longitudinally spaced members having the adjacent end portions bent forwardly for attachment to the central portion of the impact section and a clamp plate adapted to clamp said spaced ends to said impact section, said clamp plate having an aperture therein to provide an opening between the ends of said spaced members.

19. A bumper bar comprising spaced members connected to each other by a plate clamped to the members and having an aperture opposite the space between the members.

20. A bumper bar having a central portion horizontally offset to reinforce an impact section and vertically offset to provide a space for the reception of a vehicle crank.

21. A bumper bar comprising a pair of members spaced apart at their inner ends and a clamp connecting said spaced ends, said clamp being shaped to provide an open space between the ends of said members.

22. A clamp plate for connecting bumper bars, said plate having an aperture therethrough for the reception of a vehicle crank.

23. A clamp plate adapted to connect and be clamped to the spaced ends of bumper bars, said plate being shaped to provide an aperture opposite the space between the ends of said bars.

24. A clamp for connecting bars of a vehicle bumper, said clamp consisting of a pair of plates having registering apertures adapted to provide a recess for a vehicle crank and having bearing surfaces adapted to bear upon the front and rear surfaces of the bars, and means for drawing said plates toward each other.

25. A clamp for connecting longitudinally spaced ends of bumper bars, said clamp comprising a plate adapted to bear upon surfaces of said bars and having an aperture therein opposite the space between the ends of said bars, a plate adapted to bear upon the opposite surfaces of said bars and means for drawing said plates toward each other.

In testimony whereof, I hereunto affix my signature.

FRANCIS H. GOODRICH.